US009000730B2

(12) United States Patent
Murawaka

(10) Patent No.: US 9,000,730 B2
(45) Date of Patent: Apr. 7, 2015

(54) CHARGING DEVICE AND CHARGING METHOD THAT NOTIFY A USER ABOUT THE STATE OF CHARGE OF A VEHICLE STORAGE BATTERY

(75) Inventor: Katsutoshi Murawaka, Kasugai (JP)

(73) Assignees: Toyota Jidosha Kabushiki Kaisha, Toyota (JP); Toyota Housing Corporation, Nagoya (JP)

( * ) Notice: Subject to any disclaimer, the term of this patent is extended or adjusted under 35 U.S.C. 154(b) by 365 days.

(21) Appl. No.: 13/513,037

(22) PCT Filed: Dec. 14, 2010

(86) PCT No.: PCT/IB2010/003238
§ 371 (c)(1),
(2), (4) Date: May 31, 2012

(87) PCT Pub. No.: WO2011/073765
PCT Pub. Date: Jun. 23, 2011

(65) Prior Publication Data
US 2012/0293122 A1    Nov. 22, 2012

(30) Foreign Application Priority Data
Dec. 17, 2009  (JP) .................................. 2009-286429

(51) Int. Cl.
*H02J 7/00*     (2006.01)
*B60L 11/18*   (2006.01)

(52) U.S. Cl.
CPC ........... *B60L 11/1816* (2013.01); *B60L 11/184* (2013.01); *B60L 11/185* (2013.01);
(Continued)

(58) Field of Classification Search
CPC ............ B60L 11/1861; B60L 2260/52; Y02T 10/7044; Y02T 10/705

USPC .............................. 320/109, 132–134; 701/22
See application file for complete search history.

(56) References Cited

U.S. PATENT DOCUMENTS 5,349,535 A * 9/1994 Gupta ............................. 702/63
5,450,321 A * 9/1995 Crane .......................... 701/31.6
(Continued)

FOREIGN PATENT DOCUMENTS

| EP | 2 219 278 A1 | 8/2010 |
| JP | A-5-137211 | 6/1993 |

(Continued)

OTHER PUBLICATIONS

Feb. 6, 2012 International Search Report issued in International Patent Application No. PCT/IB2010/003238.
(Continued)

*Primary Examiner* — Naum B Levin
(74) *Attorney, Agent, or Firm* — Oliff PLC

(57) ABSTRACT

A user inputs a travel distance after last charging of a storage battery of a vehicle into an input field. A capacity of the storage battery at a current charge starting point in time is estimated from a capacity of the storage battery at a last charge ending point in time stored at the last charging and the input travel distance. The estimated capacity of the storage battery is displayed in a display field. During charging of the storage battery, detecting charge current and voltage to estimate a current capacity of the storage battery during charging, a remaining charging period of time and a distance-to-empty by the current capacity and displaying the estimated current capacity, remaining charging period of time and distance-to-empty in display fields are repeated.

19 Claims, 8 Drawing Sheets

(52) U.S. Cl.
CPC .......... *B60L2230/16* (2013.01); *B60L 2260/56* (2013.01); *Y02T 10/7005* (2013.01); *Y02T 10/7088* (2013.01); *Y02T 10/7258* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 5,479,085 | A * | 12/1995 | Honda et al. | 320/134 |
| 5,539,318 | A * | 7/1996 | Sasaki | 324/428 |
| 5,606,243 | A * | 2/1997 | Sakai et al. | 320/134 |
| 5,650,710 | A | 7/1997 | Hotta | |
| 5,670,830 | A * | 9/1997 | Koga et al. | 307/10.1 |
| 5,686,895 | A * | 11/1997 | Nakai et al. | 340/636.1 |
| 5,815,824 | A * | 9/1998 | Saga et al. | 701/22 |
| 6,160,380 | A * | 12/2000 | Tsuji et al. | 320/132 |
| 6,465,988 | B2 * | 10/2002 | Ito et al. | 320/131 |
| 7,848,073 | B2 * | 12/2010 | Takahashi | 361/93.2 |
| 7,933,695 | B2 * | 4/2011 | Yamaguchi | 701/22 |
| 2007/0029993 | A1 * | 2/2007 | Chao et al. | 324/130 |
| 2008/0262667 | A1 * | 10/2008 | Otabe | 701/22 |
| 2009/0222143 | A1 | 9/2009 | Kempton | |
| 2010/0072946 | A1 * | 3/2010 | Sugano | 320/108 |
| 2010/0217485 | A1 | 8/2010 | Ichishi | |
| 2011/0046832 | A1 * | 2/2011 | Francoeur | 701/22 |

FOREIGN PATENT DOCUMENTS

| | | |
|---|---|---|
| JP | A-7-123519 | 5/1995 |
| JP | A-9-233720 | 9/1997 |
| JP | A-11-233156 | 8/1999 |
| JP | A-2003-281231 | 10/2003 |
| JP | B2-3554057 | 8/2004 |
| JP | A-2005-198445 | 7/2005 |
| JP | A-2007-97347 | 4/2007 |
| JP | A-2008-126788 | 6/2008 |
| WO | WO 2009/069481 A1 | 6/2009 |

OTHER PUBLICATIONS

Feb. 6, 2012 Written Opinion of the International Searching Authority issued in International Patent Application No. PCT/IB2010/003238.

* cited by examiner

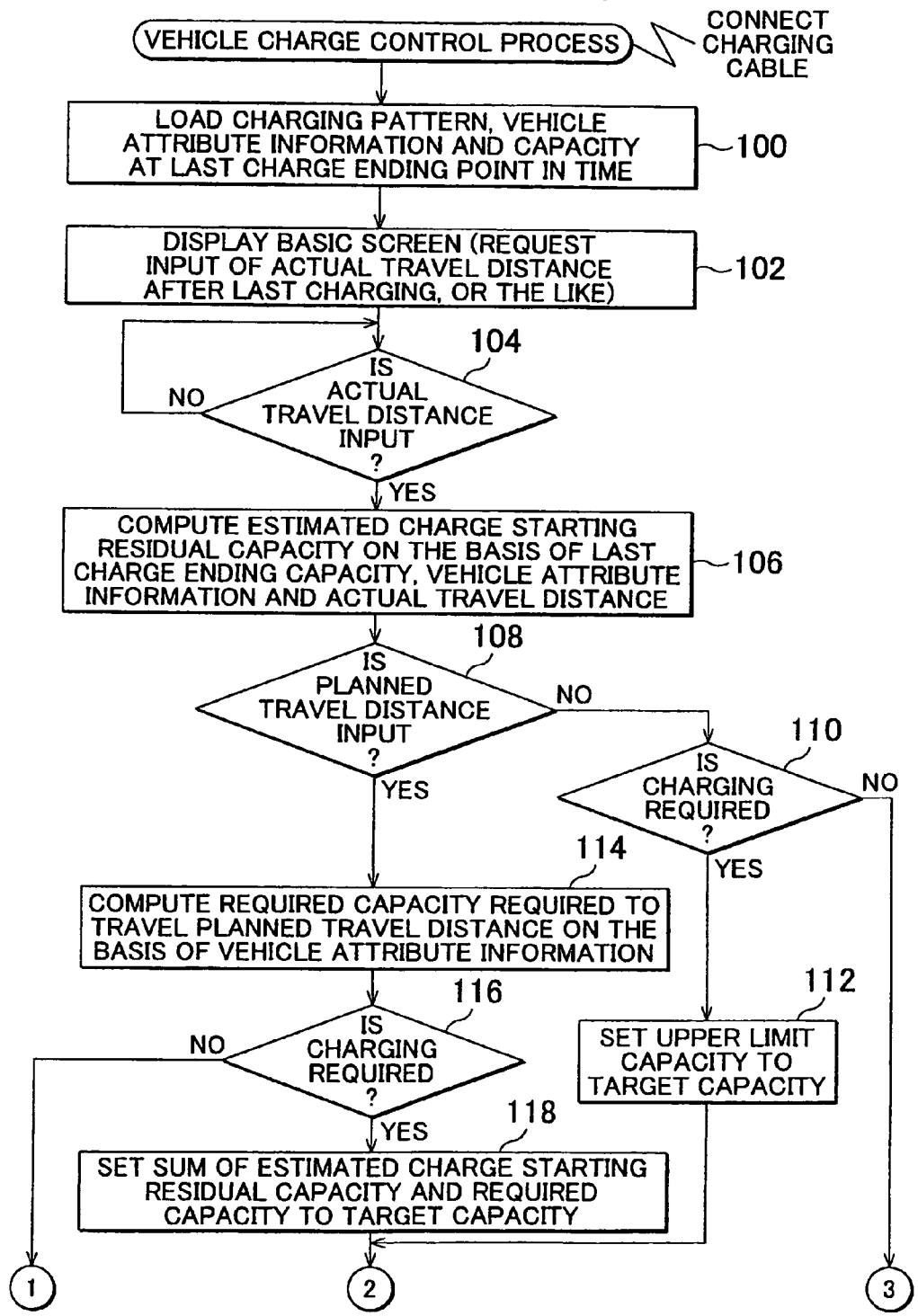

FIG. 4A

EXAMPLE OF BASIC SCREEN

```
CHARGING BATTERY OF VEHICLE IS STARTED      — 66A
INPUT TRAVEL DISTANCE AFTER LAST CHARGING
(INDISPENSABLE)                              — 60
  TRAVEL DISTANCE AFTER
  LAST CHARGING  [ 50 ] km                   — 62A
  → BATTERY RESIDUAL CAPACITY
  (ESTIMATED VALUE)  [ 0% ]                  — 64

SPECIFY DESIRED CHARGING CONDITIONS (OPTION)
SELECT "AUTOMATIC CHARGING" IF NO DESIRED
CHARGING CONDITION
  PLANNED TRAVEL DISTANCE
  BEFORE NEXT CHARGING  [    ] km            — 62B
  CHARGE ENDING TIME  [   ] : [   ]          — 62C
  CHARGE STARTING TIME [   ] : [   ]         — 62D

[ SPECIFICATION ]   [ AUTOMATIC ]
  [  COMPLETED   ]    [ CHARGING  ]
        68A                68B
```

FIG. 4B

EXAMPLE OF CHARGING DISPLAY SCREEN

```
CURRENT STATUS OF CHARGING                    — 70
  ■ CHARGING       □ CHARGING COMPLETED      — 72
  □ STOPPED        □ ABNORMAL STOP

CURRENT CAPACITY
(ESTIMATED VALUE)                [ 0% ]      — 74A
REMAINING CHARGING               [ hh HOUR ]
PERIOD OF TIME (ESTIMATED)       [ mm MINUTE ] — 74B
DISTANCE-TO-EMPTY (ESTIMATED)    [ ddkm ]    — 74C
BY CURRENT CAPACITY

SELECT "STOP CHARGING" WHEN STOPPING
  CHARGING MIDWAY

[   STOP   ]
           [ CHARGING ]
                76
```

EXAMPLE OF ACTUAL CHARGING PATTERN
(ESTIMATED CHARGE STARTING RESIDUAL CAPACITY = LOWER LIMIT VALUE, TARGET CAPACITY = LOWER LIMIT VALUE + REQUIRED CAPACITY, CHARGE ENDING TIME IS SPECIFIED)

CHARGING DEVICE AND CHARGING METHOD THAT NOTIFY A USER ABOUT THE STATE OF CHARGE OF A VEHICLE STORAGE BATTERY

BACKGROUND OF THE INVENTION

1. Field of the Invention

The invention relates to a charging device and a charging method and, more particularly, to a charging device that includes electric power supply means for supplying electric power for charging a storage battery equipped for a vehicle.

2. Description of the Related Art

In recent years, for the purpose of reduction in CO2, or the like, a hybrid vehicle that is equipped with a storage battery and that uses an engine and a motor as power sources is widely used, and an electric vehicle that is equipped with a storage battery and that uses only a motor as a power source also becomes a focus of attention. In addition, the storage battery in the hybrid vehicle is charged mainly with electric power generated by the engine; however, for the purpose of further reduction of CO2, a hybrid vehicle (so-called plug-in hybrid vehicle) in which a storage battery is chargeable even by electric power of an external power supply, such as a commercial power supply supplied from a power company to a house, or the like, is scheduled to be released, and a charging facility has not become widespread as an infrastructure for an electric vehicle as well, so it has been studied that a storage battery is designed to be chargeable with a commercial power supply, or the like, supplied to a house, or the like.

However, currently, it takes a longer time to charge a storage battery of a motor-powered vehicle, such as a hybrid vehicle and an electric vehicle, than to refuel an ordinary vehicle that uses only an engine as a power source. Therefore, it is highly likely that a user leaves the vehicle while the storage battery is being charged, and it is presumable that charging is stopped before the storage battery is fully charged and then the vehicle is used by the user again. For this reason, it may be necessary to notify the user who is away from the vehicle (for example, in a house) of a time required to complete charging the storage battery, a distance by which the vehicle can travel with a current state of charge of the storage battery, and the like.

In connection with the above, Japanese Patent Application Publication No. 5-137211 (JP-A-5-137211) describes an electric vehicle that has a function of indicating a discharge capacity and a regenerative charge capacity after a last charge, a self-discharge amount caused by a standing time, a temperature of the battery, and a distance-to-empty using a discharge capacity to be discharged before the voltage reaches a last lower limit setting voltage as a dischargeable upper limit capacity.

In addition, Japanese Patent No. 3554057 describes a technique that, when estimated riding time is specified and then charging is instructed, a required charging period of time is computed on the basis of a discharge amount of an electric vehicle storage battery at the time when charging is instructed, a detected power supply voltage and a predetermined charge current, a charge starting time for completing charging at the estimated riding time is computed on the basis of the specified estimated riding time and the computed required charging period of time, and then charging is started from the computed charge starting time.

The techniques described in the above JP-A-5-137211 and Japanese Patent No. 3554057 each are supposed to measure a charge and discharge capacity, or the like, of the storage battery. In order to notify the user of the state of charge, or the like, of the storage battery by a charging device installed at a location, such as a house, remote from the vehicle using these techniques, it is necessary to transmit the measured charge and discharge capacity, or the like, of the storage battery from the vehicle to the charging device. However, the existing specifications of a charging cable used to charge a storage battery of a vehicle do not assume an exchange of information between the vehicle and the charging device, so it is necessary to additionally provide communication means for exchanging information, such as the measured charge and discharge capacity of the storage battery, between the vehicle and the charging device. This leads to a complicated system configuration.

SUMMARY OF INVENTION

The invention provides a charging device and charging method that are able to notify a user of information about the state of charge of a storage battery of a vehicle without means for communicating with the vehicle.

A first aspect of the invention relates to a charging device. The charging device includes: electric power supply means for supplying electric power to charge a storage battery equipped for a vehicle in accordance with a preset charging pattern; estimating means for estimating a residual capacity of the storage battery at a current charge starting point in time of the storage battery on the basis of a capacity of the storage battery at a last charge ending point in time of the storage battery and a travel distance of the vehicle from the last charge ending point in time, and that estimates at least one of a distance-to-empty of the vehicle and a required charging period of time to complete current charging of the storage battery in process of the current charging of the storage battery on the basis of the estimated residual capacity at the current charge starting point in time of the storage battery and the charging pattern or an amount of electric power supplied after the current charge starting point in time; and output means for outputting at least one of the distance-to-empty estimated by the estimating means, the required charting period of time estimated by the estimating means, and current charge ending time derived from the required charging period of time.

With the above configuration, electric power to charge the storage battery equipped for the vehicle in accordance with the preset charging pattern is supplied by the electric power supply means, and the storage battery of the vehicle is charged with electric power supplied by the electric power supply means in accordance with the charging pattern. Here, in order to notify the user of information about the state of charge of the storage battery of the vehicle, it is necessary to know the residual capacity of the storage battery at the charge starting point in time; however, the residual capacity of the storage battery at the charge starting point in time may be estimated from a capacity at the last charge ending point in time of the storage battery and a travel distance of the vehicle after last charging of the storage battery. When the last charging of the storage battery is performed by the same charging device, the capacity of the storage battery at the last charge ending point in time may be acquired without communication with the vehicle. In addition, the travel distance of the vehicle after the last charging of the storage battery may also be acquired through an input of the user, or the like, without communication with the vehicle.

The estimating means estimates a residual capacity of the storage battery at the current charge starting point in time on the basis of the capacity of the storage battery at the last charge ending point in time and the travel distance of the vehicle after the last charging of the storage battery, and estimates at least one of a distance-to-empty of the vehicle and a required charging period of time to complete the current charging of the storage battery in process of the current charging of the storage battery on the basis of the estimated residual capacity of the storage battery at the current charge starting point in time and the charging pattern or an amount of electric power supplied after the current charge starting point in time.

Then, the output means outputs at least one of the distance-to-empty estimated by the estimating means, the required charging period of time estimated by the estimating means, and charge ending time derived from the required charging period of time, so the user is able to recognize the state of charge of the storage battery of the vehicle on the basis of at least one of the distance-to-empty, required charging period of time and charge ending time (any of these is information about the state of charge of the storage battery of the vehicle) output by the output means. In this way, with the above configuration, it is possible to notify the user of the state of charge of the storage battery of the vehicle without means for communicating with the vehicle.

The charging device according to the above aspect may further include capacity memory control means for storing a capacity at a charge ending point in time of the storage battery in memory means each time charging of the storage battery ends, wherein the estimating means may load the capacity at the last charge ending point in time of the storage battery from the memory means, may compute a total amount of electric power used in the vehicle after last charging of the storage battery on the basis of a travel distance of the vehicle after the last charging of the storage battery, input through input means, and a predetermined amount of electric power used per unit travel distance of the vehicle, and then may estimate a residual capacity at the current charge starting point in time of the storage battery on the basis of the loaded capacity at the charge ending point in time and the computed total amount of electric power used.

In the charging device according to the above aspect, when the vehicle includes power generating means and electric power generated by the power generating means is configured to be stored in the storage battery, the estimating means may use a value that is obtained by subtracting an amount of electric power generated by the power generating means after the last charging of the storage battery from a total amount of electric power used by the vehicle after the last charging of the storage battery to thereby estimate a residual capacity at the current charge starting point in time of the storage battery. With the above configuration, when the vehicle includes power generating means and electric power generated by the power generating means is configured to be storable in the storage battery, it is possible to improve the accuracy of estimating the residual capacity of the storage battery at the current charge starting point in time.

In addition, in the charging device according to the above aspect, the estimating means may estimate a current capacity of the storage battery in process of the current charging of the storage battery and may acquire an amount of electric power used per unit travel distance of the vehicle on the basis of the estimated residual capacity at the current charge starting point in time of the storage battery and the charging pattern or the amount of electric power supplied after the current charge starting point in time, and may estimate the distance-to-empty of the vehicle on the basis of the estimated current capacity of the storage battery and the acquired amount of electric power used per unit travel distance.

In addition, in the charging device according to the above aspect, when the vehicle includes power generating means and electric power generated by the power generating means is configured to be stored in the storage battery, the estimating means may estimate a value that is obtained by adding a distance that the vehicle can travel using the amount of electric power generated by the power generating means to a distance that the vehicle can travel and that is obtained from the estimated current capacity of the storage battery and the acquired amount of electric power used per unit travel distance as the distance-to-empty of the vehicle. With the above configuration, when the vehicle includes power generating means and electric power generated by the power generating means is configured to be storable in the storage battery, it is possible to improve the accuracy of estimating the distance-to-empty of the vehicle.

In addition, in the charging device according to the above aspect, the estimating means may estimate a current capacity of the storage battery in process of the current charging of the storage battery and may acquire an amount of electric power used per unit travel distance of the vehicle on the basis of the estimated residual capacity at the current charge starting point in time of the storage battery and the charging pattern or the amount of electric power supplied after the current charge starting point in time, and may obtain a temporal difference in the charging pattern between the estimated current capacity of the storage battery and a target capacity of the storage battery to thereby estimate the required charging period of time to complete the current charging of the storage battery.

In addition, in the charging device according to the above aspect, the estimating means may obtain a temporal difference in the charging pattern between the estimated residual capacity at the current charge starting point in time of the storage battery and a target capacity of the storage battery as a charging period of time from a charge starting point in time of the storage battery to a charge ending point in time of the storage battery and may subtract a period of time elapsed from the current charge starting point in time of the storage battery from the obtained charging period of time in process of the current charging of the storage battery to thereby estimate the required charging period of time to complete the current charging of the storage battery.

In addition, in the charging device according to the above aspect, when a planned travel distance of the vehicle to next charging of the storage battery is specified, the estimating means may estimate a required capacity of the storage battery required by the vehicle to travel the specified planned travel distance on the basis of the specified planned travel distance of the vehicle and the amount of electric power used per unit travel distance of the vehicle, and may set the target capacity on the basis of the estimated required capacity of the storage battery. With the above configuration, the user specifies the planned travel distance to next charging of the storage battery. By so doing, it is possible to charge the storage battery by a capacity required by the vehicle to travel the specified planned travel distance, that is, perform charging in consideration of the long service life of the storage battery.

In addition, in the charging device according to the above aspect, when the vehicle includes power generating means and electric power generated by the power generating means is configured to be stored in the storage battery, the estimating means may estimate a required capacity of the storage battery, required by the vehicle to travel the specified planned travel distance, on the basis of a value obtained by subtracting an amount of electric power generated by the power generating means from an amount of electric power that is used when the vehicle travels the planned travel distance and that is obtained from the specified planned travel distance of the vehicle and the amount of electric power used per unit travel distance of the vehicle. With the above configuration, when the vehicle includes power generating means and electric power generated by the power generating means is configured to be storable in the storage battery, it is possible to improve the accuracy of estimating the required capacity of the storage battery required by the vehicle to travel the specified planned travel distance.

In addition, the charging device according to the above aspect may further include detecting means for detecting electric power supplied by the electric power supply means, wherein the estimating means may estimate an increase in capacity of the storage battery after the current charge starting point in time of the storage battery on the basis of an amount of electric power that is supplied after the current charge starting point in time and that is obtained by accumulating electric power detected by the detecting means, and may estimate a current capacity of the storage battery on the basis of the estimated increase in capacity and the residual capacity at the current charge starting point in time of the storage battery.

In addition, in the charging device according to the above aspect, the charging pattern may have a forced charging period, in which charging electric power to the storage battery at a last stage of a charging period of the storage battery is decreased as compared with charging electric power before the last stage within the charging period, and, when the electric power detected by the detecting means changes to a value corresponding to the forced charging period, the estimating means may correct the estimated current capacity of the storage battery to a capacity of the storage battery at a starting point in time of the forced charging period, the capacity being defined in the charging pattern. With the above configuration, when the charging pattern has a forced charging period, it is possible to correct the estimated current capacity of the storage battery to a further accurate value at the time of start of forced charging.

In addition, in the charging device according to the above aspect, when the power generating means is configured to generate regenerative electric power, the estimating means may acquire an amount of regenerative electric power per unit travel distance, generated by the power generating means, and then may estimate an amount of electric power generated by the power generating means on the basis of the acquired amount of regenerative electric power per unit travel distance and a travel distance of the vehicle.

In addition, in the charging device according to the above aspect, when the power generating means is configured to perform photovoltaic power generation, the estimating means may acquire an amount of electric power generated per unit time by the power generating means and an average travel speed of the vehicle, and then may estimate an amount of electric power generated by the power generating means on the basis of the acquired amount of electric power generated per unit time, a travel distance of the vehicle and a travel period of time of the vehicle, obtained from the acquired average travel speed of the vehicle.

A second aspect of the invention relates to a charging method. The charging method includes: supplying electric power to charge a storage battery equipped for a vehicle in accordance with a preset charging pattern; estimating a residual capacity of the storage battery at a second charge starting point in time of the storage battery on the basis of a capacity of the storage battery at a first charge ending point in time of the storage battery and a travel distance of the vehicle after the first charge ending point in time, wherein second charging is subsequent to first charging; estimating at least one of a distance-to-empty of the vehicle and a required charging period of time to complete the second charging in process of the second charging of the storage battery on the basis of the estimated residual capacity at the second charge starting point in time of the storage battery and the charging pattern or an amount of electric power supplied after the second charge starting point in time; and outputting at least one of the estimated distance-to-empty, the estimated required charging period of time, and charge ending time of the second charging, derived from the required charging period of time.

As described above, the aspect of the invention estimates a residual capacity of a storage battery at a current charge starting point in time on the basis of a capacity of the storage battery at a last charge ending point in time and a travel distance of the vehicle after last charging of the storage battery, estimates at least one of a distance-to-empty of the vehicle and a required charging period of time to complete the current charging of the storage battery in process of the current charging of the storage battery on the basis of the estimated residual capacity of the storage battery at the current charge starting point in time and a charging pattern of the storage battery or an amount of electric power supplied after the current charge starting point in time, and outputs at least one of the estimated distance-to-empty, the estimated required charging period of time, and charge ending time derived from the required charging period of time. Thus, it is possible to notify the user of information about the state of charge of the storage battery of the vehicle without means for communicating with the vehicle.

BRIEF DESCRIPTION OF DRAWINGS

The features, advantages, and technical and industrial significance of this invention will be described below with reference to the accompanying drawings, in which like numerals denote like elements, and wherein:

FIGS. 2A and 2B are flowcharts that show the details of vehicle charge control process according to the embodiment of the invention;

FIG. 4A is an image view that shows an example of a basic screen;

FIG. 4B is an image view that shows an example of a charging display screen;

DETAILED DESCRIPTION OF EMBODIMENTS

Figure 1:
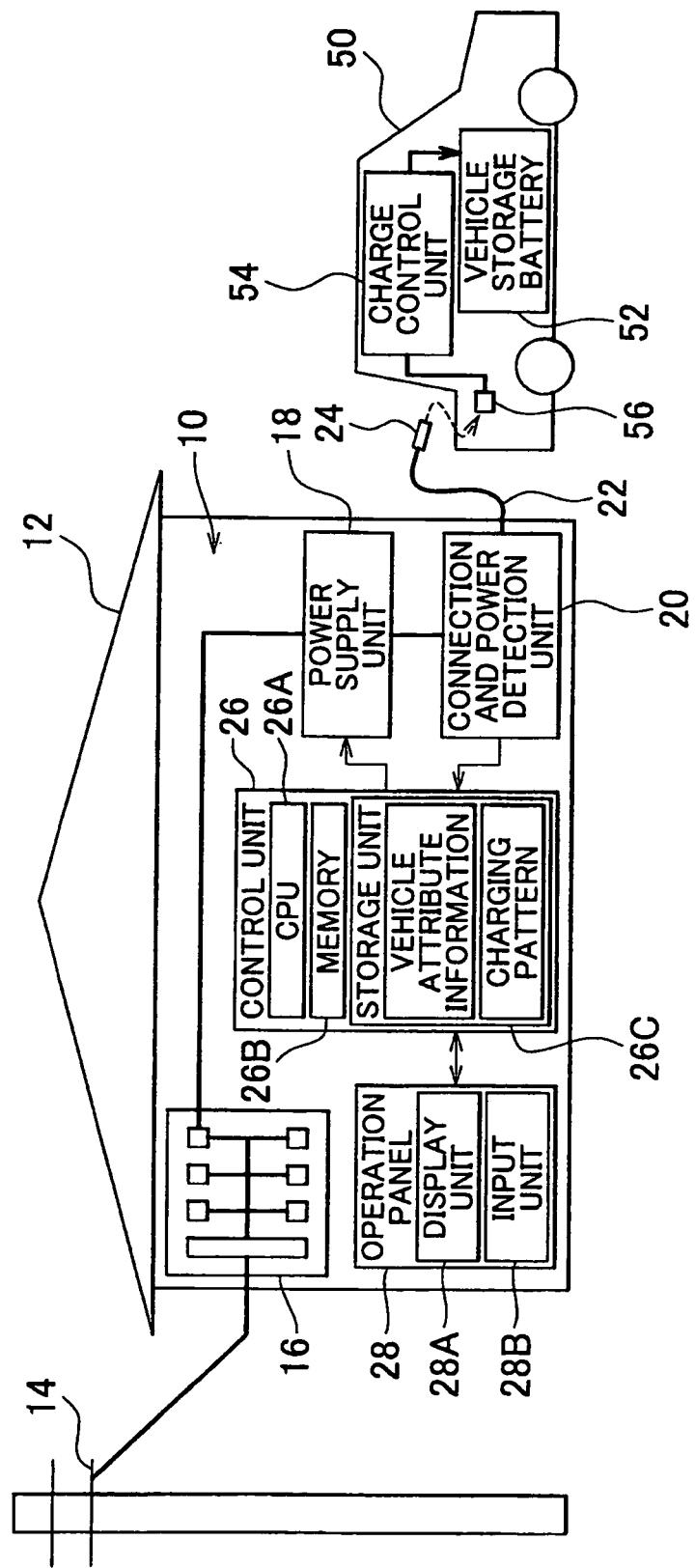
FIG. 1 is a schematic view that shows a vehicle and a house in which a charging device according to an embodiment of the invention is installed.

Hereinafter, an embodiment of the invention will be described in detail with reference to the accompanying drawings. FIG. 1 shows a house 12 and a vehicle 50. A charging device 10 according to the present embodiment is installed in the house 12. The vehicle 50 is equipped with a vehicle storage battery 52. The vehicle storage battery 52 is charged by the charging device 10 in a state where the vehicle 50 is parked in a parking lot near the house 12. Note that, in the present embodiment, the house 12 is a house in which a user of the vehicle 50 lives. In addition, in FIG. 1, the house 12 is shown as a detached house; however, the house 12 may be an apartment house. In addition, the vehicle 50 may be desirably a vehicle that is able to travel using a motor as a power source, and may be, for example, an electric vehicle or a hybrid vehicle. Hereinafter, the description will be made on the assumption that the vehicle 50 is an electric vehicle.

The charging device 10 installed in the house 12 includes a power supply unit 18 that is connected to a system power supply (commercial power supply, or the like, supplied from a power company) 14 via a panel board 16. A connection and power detection unit 20 and a control unit 26 are connected to the power supply unit 18. The power supply unit 18 has a function of converting electric power, supplied from the system power supply 14 through the panel board 16, into (direct current or alternating current) electric power for charging the vehicle storage battery 52. The power supply unit 18 supplies charging electric power to the connection and power detection unit 20 in accordance with a command from the control unit 26.

The connection and power detection unit 20 has a function of a power supply connecting portion of the house 12. When the vehicle storage battery 52 is charged, a connector 24 provided at the distal end of a charging cable 22 is connected to (so-called, plugged into) a power supply connecting portion 56 (which will be described later) of the vehicle 50. By so doing, in a state where the connection and power detection unit 20 is electrically connected to the power supply connecting unit 56 of the vehicle 50 through the charging cable 22, the connection and power detection unit 20 supplies the vehicle 50 with charging electric power supplied from the power supply unit 18 to thereby cause the vehicle storage battery 52 to be charged at the vehicle 50 side.

In addition, the connection and power detection unit 20 is connected to the control unit 26, constantly monitors (even during charging of the vehicle storage battery 52) whether the status of electrical connection with the power supply connecting portion 56 of the vehicle 50 is changed, and notifies the control unit 26 each time the status of electrical connection with the power supply connecting portion 56 is changed. Furthermore, the connection and power detection unit 20 detects the instantaneous voltage and current of charging electric power supplied to the vehicle 50 through the charging cable 22 while the vehicle storage battery 52 is being charged, and then outputs the detected instantaneous voltage and current to the control unit 26.

Figure 5A:
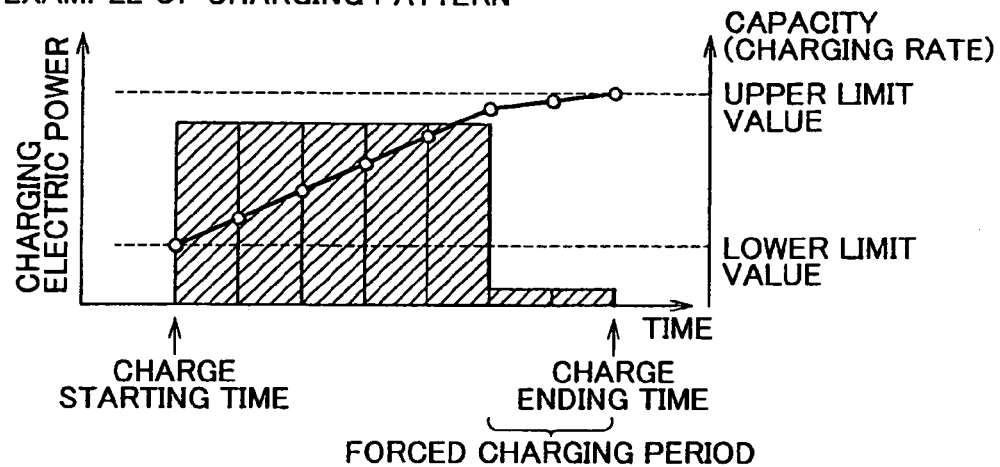
FIG. 5A is a schematic graph of an example of a charging pattern.

The control unit 26 is formed of a microcomputer, and includes a CPU 26A, a memory 26B formed of a ROM, a RAM, or the like, and a nonvolatile storage unit 26C formed of a hard disk drive (HDD), a flash memory, or the like. The storage unit 26C prestores information indicating a charging pattern (an example of which is shown in FIG. 5A) applied when charging the vehicle storage battery 52 of the vehicle 50 and other attribute information (which will be described in detail later) of the vehicle 50. A program (not shown) by which the CPU 26A executes charge control process (which will be described later) is installed in the storage unit 26C. Note that information, such as the charging pattern, stored in the storage unit 26C may be downloaded from a server via a computer network, such as the Internet, or may be loaded from a storage medium, such as a USB memory.

In addition, an operation panel 28 is connected to the control unit 26. The operation panel 28 includes a display unit 28A and an input unit 28B. The display unit 28A is formed of an LCD, or the like, and is able to display selected information. The input unit 28B is formed of a touch panel, a numeric keypad, or the like, arranged on the display surface of the display unit 28A, and is allowed to input information. The control unit 26 causes the display unit 28A of the operation panel 28 to display a predetermined screen (which will be described in detail later). In addition, information input by the user through the input unit 28B is input from the operation panel 28 to the control unit 26.

Note that the power supply unit 18 is an example of electric power supply means according to the aspect of the invention, the display unit 28A of the operation panel 28 is an example of output means according to the aspect of the invention, the connection and power detection unit 20 is an example of detecting means according to the aspect of the invention, and the storage unit 26C is an example of memory means according to the aspect of the invention. In addition, the control unit 26 functions as estimating means and capacity memory control means according to the aspect of the invention.

On the other hand, the vehicle 50 is provided with the power supply connecting portion 56 to which the connector 24 of the charging cable 22 is connected during charging of the vehicle storage battery 52, and the power supply connecting portion 56 is connected to a charge control unit 54 equipped for the vehicle 50. The charge control unit 54 incorporates a nonvolatile storage unit (not shown) in which information indicating the above described charging pattern is prestored. The charge control unit 54 is connected to the vehicle storage battery 52. For example, as shown in FIG. 5A, the charging pattern defines a charging electric power supplied to the vehicle storage battery 52 for each time interval within a charging period when the vehicle storage battery 52 is charged from a lower limit capacity $C_L$ to an upper limit capacity $C_H$. In FIG. 5A, the height of each of a plurality of hatched rectangles indicates the magnitude of a charging electric power for each time interval, and the line graph indicates a change in the capacity of the vehicle storage battery 52 with a lapse of time during charging. Note that the charging pattern is generally a pattern for which a charging electric power at the last stage of the charging period is greatly smaller than a charging electric power before the last stage within the charging period as shown in FIG. 5A; however, in the present specification, the last stage of the charging period during which the charging electric power is reduced is termed forced charging period.

When the connector 24 is connected to the power supply connecting portion 56 to electrically connect the power supply connecting portion 56 to the connection and power detection unit 20 of the charging device 10 via the charging cable 22 and then the vehicle storage battery 52 is placed in a chargeable state, the charge control unit 54 loads information indicating the charging pattern from the storage unit and detects the current capacity of the vehicle storage battery 52. Then, the charge control unit 54 determines a point at which the capacity indicated by the line coincides with the current capacity of the vehicle storage battery 52 among points in the charging pattern indicated by the loaded information along the time axis (abscissa axis) of the charging pattern, and then extracts the charging pattern located on the right-hand side of the determined point along the time axis.

Then, the charge control unit 54 draws electric power having a magnitude equal to the magnitude of charging electric power at the left end point (charge starting point) of the extracted charging pattern from the connection and power detection unit 20 of the charging device 10 through the charging cable 22 and then supplies the drawn electric power to the vehicle storage battery 52. By so doing, the charge control unit 54 starts charging the vehicle storage battery 52 and shifts a reference point for charging electric power in the extracted charging pattern rightward along the time axis with a lapse of time, and then causes the magnitude of electric power drawn from the connection and power detection unit 20 and supplied to the vehicle storage battery 52 to coincide with the magnitude of charging electric power at the reference point in the extracted charging pattern to thereby execute control so that the vehicle storage battery 52 is charged in accordance with the extracted charging pattern.

Next, the operation of the present embodiment will be described. When the vehicle storage battery 52 equipped for the vehicle 50 is charged, the user of the vehicle 50 initially parks the vehicle 50 at a parking lot adjacent to the house 12 in which the user lives (house 12 in which the charging device 10 is installed), and then connects the connector 24 of the distal end of the charging cable 22 to the power supply connecting portion 56 of the vehicle 50. When the above operation is performed, the status of electrical connection between the connection and power detection unit 20 and the power supply connecting portion 56 of the vehicle 50 changes from "disconnected" to "connected". Thus, the change of the status of electrical connection is detected by the connection and power detection unit 20, and notification that the connector 24 is electrically connected to the power supply connecting portion 56 of the vehicle 50 is provided to the control unit 26.

Figure 2B:
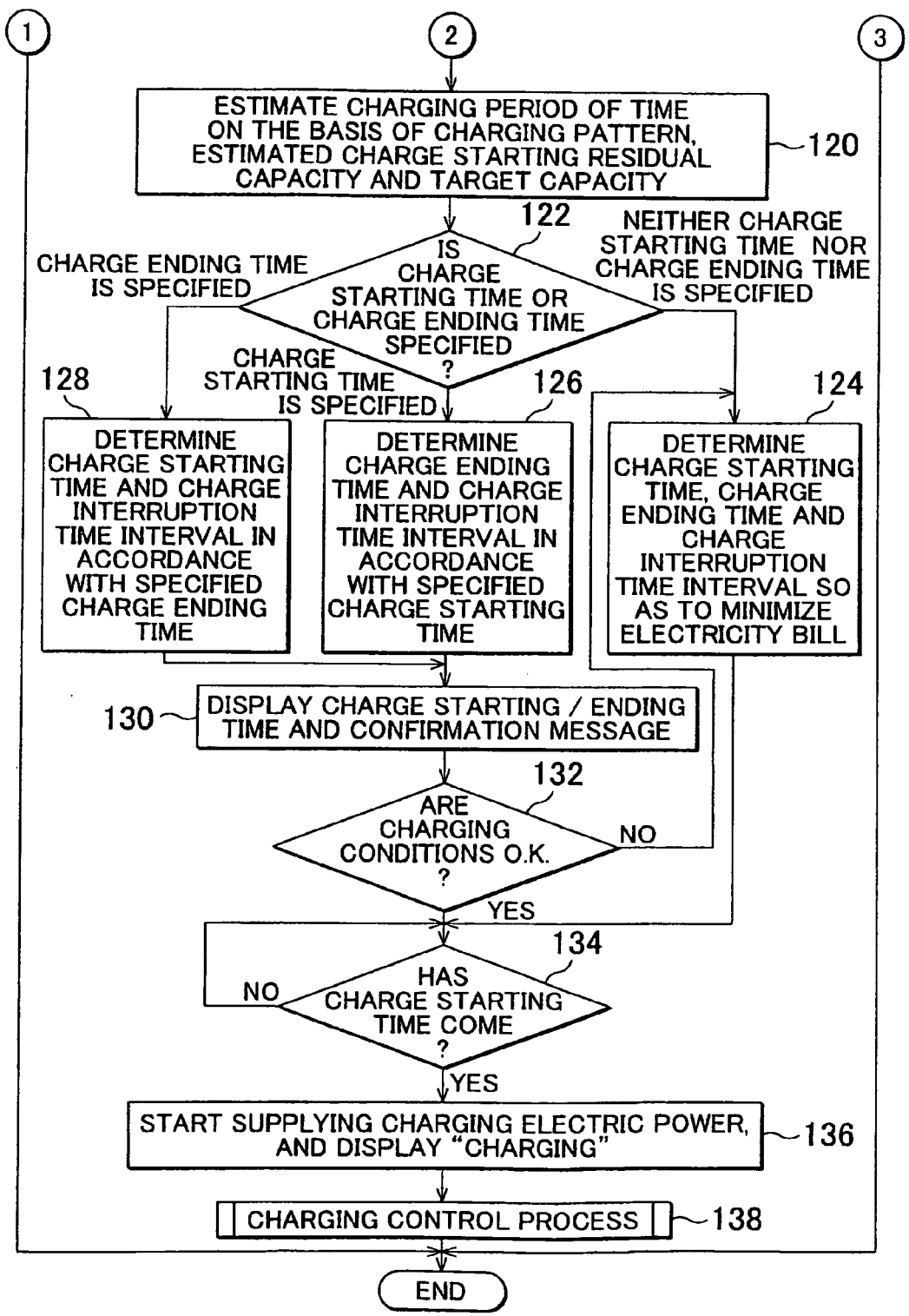

When the control unit 26 receives the notification that the connection and power detection unit 20 is electrically connected to the power supply connecting portion 56 of the vehicle 50 via the charging cable 22, the control unit 26 executes vehicle charge control process shown in FIGS. 2A and 2B. In the vehicle charge control process, first, in step 100, information indicating the charging pattern, vehicle attribute information and the capacity of the vehicle storage battery 52 at a charge ending point in time (last charge ending capacity $C_{EB}$) stored through the vehicle charge control process at the time of last charging (example of first charging) of the vehicle storage battery 52 are loaded from the storage unit 26C.

In the next step 102, for example, a basic screen 60 shown in FIG. 4A is displayed on the display unit 28A of the operation panel 28. The basic screen 60 has an input field 62A and a display field 64. The input field 62A is used to input an actual travel distance $D_B$ of the vehicle 50 after last charging of the vehicle storage battery 52. The display field 64 is used to display an estimated residual capacity of the vehicle storage battery 52. The basic screen 60 also displays a message 66A for requesting an input of the actual travel distance $D_B$. Therefore, because the basic screen 60 is displayed on the display unit 28A of the operation panel 28, after connecting the connector 24 to the power supply connecting portion 56, the user comes to a site at which the operation panel 28 is installed in the house 12 and then visually recognizes the basic screen 60 displayed on the display unit 28A of the operation panel 28. The user is required to input the actual travel distance $D_B$ of the vehicle 50 after the last charging of the vehicle storage battery 52. Then, the user inputs the actual travel distance $D_B$ into the input field 62A through the input unit 28B.

In addition, in the vehicle charge control process according to the present embodiment, when the vehicle storage battery 52 is charged, a planned travel distance of the vehicle 50 before next charging (example of third charging performed the time after next with respect to the first charging) of the vehicle storage battery 52 and at least one of charge ending time $t_E$ and charge starting time $t_S$ may be specified as charging conditions. The basic screen 60 has input fields 62B to 62D for inputting the planned travel distance, the charge ending time $t_E$ and the charge starting time $t_S$, and, where necessary, displays a message 66B for prompting the user to specify the charging conditions as well. By so doing, if the user who visually recognizes the basic screen 60 desires to specify the charging conditions, the user inputs the planned travel distance $D_N$ and at least one of the charge ending time $t_E$ and the charge starting time $t_S$ into the input fields 62B to 62D through the input unit 28B. In addition, the basic screen 60 has a button 68A and a button 68B. The button 68A is operated when specifying the charging conditions is completed. The button 68B is used to conduct the start of charging of the vehicle storage battery 52 without specifying the charging conditions. When the user completes input, the button 68A or the button 68B is selected.

In the next step 104, it is determined whether the actual travel distance of the vehicle 50 after the last charging of the vehicle storage battery 52 is input by the user, and step 104 is repeated until the determination is affirmative. When the button 68A or the button 68B in the basic screen 60 is selected by the user, the determination of step 104 is affirmative and then the process proceeds to step 106. A current capacity (estimated charge starting residual capacity $C_S$) of the vehicle storage battery 52 is estimated using the following mathematical expression (1) on the basis of the last charge ending capacity $C_{EB}$ and vehicle attribute information loaded from the storage unit 26C in step 100 and the actual travel distance $D_B$ input by the user.

$$C_S = C_{EB} - E_B - S_B \qquad (1)$$

In the above mathematical expression (1), $E_B$ is the amount of electric power consumed by the vehicle 50 for travelling after the last charging of the vehicle storage battery 52, and $S_B$ is an allowance that takes an error of the actual travel distance $D_B$, or the like, into consideration (the allowance $S_B$ may be constant or may be varied with (for example, directly proportional to) the actual travel distance $D_B$). The amount of consumed electric power $E_B$ is estimated using the following mathematical expression (2).

$$E_B = E_D \cdot D_B - E_C \cdot N_C \cdot D_B - E_S \cdot (D_B/V_A) \qquad (2)$$

Note that, in the mathematical expression (2), $E_D$ is the amount of electric power used per unit travel distance of the vehicle 50, $E_C$ is the average amount of electric power generated per each regenerative power generation performed by a regenerative power generation unit of the vehicle 50 (in a vehicle not equipped with the regenerative power generation unit, $E_C$=0), $N_C$ is the number of times of regenerative power generation per unit travel distance of the vehicle 50, $E_S$ is the average amount of electric power generated per unit time by a photovoltaic power generation unit of the vehicle 50 (a vehicle not equipped with the photovoltaic power generation unit, $E_S$=0), and $V_A$ is the average speed of the vehicle 50. These pieces of information are prestored in the storage unit 26C as the vehicle attribute information, and are acquired by loading the vehicle attribute information from the storage unit 26C in step 100.

In addition, in step 106, the estimated charge starting residual capacity $C_S$ is converted into the charging rate of the vehicle storage battery 52 (which is obtained on a percentage basis by dividing the difference between the estimated charge starting residual capacity $C_S$ and the lower limit capacity $C_L$ of the vehicle storage battery 52 by the difference between the upper limit capacity $C_H$ and lower limit capacity $C_L$ of the vehicle storage battery 52) and then the charging rate is displayed in the display field 64 of the basic screen 60.

In the next step 108, it is determined whether the planned travel distance $D_N$ is specified by the user as the charging condition. When the determination is negative, the process proceeds to step 110, and then the estimated charge starting residual capacity $C_S$ of the vehicle storage battery 52 estimated in step 106 is compared with a threshold. After that, it is determined whether it is necessary to charge the vehicle storage battery 52 on the basis of the compared result. The storage battery of an electric vehicle generally has a characteristic such that the degradation advances faster as the duration of the fully charged state elongates. When the estimated charge starting residual capacity $C_S$ is larger than or equal to the threshold, the determination of step 110 is negative, and a message such as "charging is cancelled because of sufficient residual capacity" is displayed on the display unit 28A of the operation panel 28, and then the vehicle charge control process is ended without charging the vehicle storage battery 52. This suppresses the advance of degradation of the vehicle storage battery 52 because of an excessive duration of fully charged state of the vehicle storage battery 52.

On the other hand, when the estimated charge starting residual capacity $C_S$ is smaller than the threshold in step 110, it is determined that it is necessary to charge the vehicle storage battery 52, and the process proceeds to step 112. Then, the upper limit capacity $C_H$ of the vehicle storage battery 52 is set as a target capacity $C_T$ in charging the vehicle storage battery 52, and the process proceeds to step 120. In this case, in charging control process, which will be described later, charging of the vehicle storage battery 52 is continued until the vehicle storage battery 52 becomes a fully charged state.

In addition, when the planned travel distance $D_N$ is specified by the user as the charging condition, the determination of step 108 is affirmative and the process proceeds to step 114. Then, a required capacity $C_N$ required by the vehicle 50 to travel the specified planned travel distance $D_N$ is estimated using the following mathematical expression (3) on the basis of the specified planned travel distance $D_N$ and vehicle attribute information.

$$C_N = E_N + S_N \qquad (3)$$

In the above mathematical expression (3), $E_N$ is the amount of electric power consumed when the vehicle 50 travels the planned travel distance $D_N$, and $S_N$ is an allowance that takes an error of the planned travel distance $D_N$ into consideration (the allowance $S_N$ may also be constant or may be varied with (for example, directly proportional to) the planned travel distance $D_N$). The amount of consumed electric power $E_N$ is estimated using the following mathematical expression (4).

$$E_B = E_D \cdot D_N - E_C \cdot N_C \cdot D_N - E_S \cdot (D_N/V_A) \qquad (4)$$

In the next step 116, the required capacity $C_N$ estimated in step 114 is compared with the difference between the estimated charge starting residual capacity $C_S$ estimated in step 106 and the lower limit capacity $C_L$ of the vehicle storage battery 52 (actual capacity of the vehicle storage battery 52, which may be used by the vehicle 50 for traveling), and it is determined whether it is necessary to charge the vehicle storage battery 52 on the basis of the compared result. When the required capacity $C_N$ is smaller than the actual capacity of the vehicle storage battery 52, it may be determined that the vehicle storage battery 52 has a sufficient residual capacity for the vehicle 50 to travel the planned travel distance $D_N$. Therefore, the determination of step 116 is negative, a message such as "charging is cancelled because of sufficient residual capacity" is displayed on the display unit 28A of the operation panel 28, and then the vehicle charge control process is ended without charging the vehicle storage battery 52. This suppresses unnecessary charging of the vehicle storage battery 52 to thereby extend the service life of the vehicle storage battery 52. Note that the determination of step 116 may be made negative when the required capacity $C_N$ is smaller by a predetermined value or above than the actual capacity of the vehicle storage battery 52 in consideration of various errors.

On the other hand, when the required capacity $C_N$ is larger than or equal to the actual capacity of the vehicle storage battery 52 in step 116 (or the required capacity $C_N$ is larger than or equal to a value that is obtained by subtracting the predetermined value from the actual capacity of the vehicle storage battery 52), it is determined that it is necessary to charge the vehicle storage battery 52 and the process proceeds to step 118. Then, a value obtained by adding the required capacity $C_N$ to the estimated charge starting residual capacity $C_S$ is set as the target capacity $C_T$ in charging the vehicle storage battery 52, and the process proceeds to step 120. In this case, in charging control process, which will be described later, the vehicle storage battery 52 is charged until the capacity of the vehicle storage battery 52 is increased by the required capacity $C_N$. Note that as the target capacity $C_T$, instead of the value that is obtained by adding the required capacity $C_N$ to the estimated charge starting residual capacity $C_S$, a value obtained by adding the required capacity $C_N$ to the lower limit capacity $C_L$ of the vehicle storage battery 52 may be used. In this case, in the charging control process, which will be described later, the vehicle storage battery 52 is charged until the actual capacity of the vehicle storage battery 52 reaches the required capacity $C_N$.

In step 120, the charging period of time T of the vehicle storage battery 52 is estimated using the following mathematical expression (5) on the basis of the charging pattern of which information is loaded from the storage unit 26C in step 100, the estimated charge starting residual capacity $C_S$ estimated in step 106 and the target capacity $C_T$ set in step 112 or step 118.

$$T = T(C_T) - T(C_S) + S_{T1} \qquad (5)$$

In the mathematical expression (5), T(C) is a required period of time during which the capacity increases from the lower limit capacity $C_L$ of the vehicle storage battery 52 to a capacity C when the vehicle storage battery 52 is charged in accordance with the charging pattern. When capacity C=lower limit capacity $C_L$, T(C)=0. In addition, $S_{T1}$ is a time allowance that takes a charging error into consideration. $S_{T1}$ may be constant or may be varied with (directly proportional to) a value of "$T(C_T)-T(C_S)$".

In the next step 122, it is determined whether the charge starting time $t_S$ or the charge ending time $t_E$ is specified by the user as the charging condition. When neither the charge starting time $t_S$ nor the charge ending time $t_E$ is specified by the user, the process proceeds from step 122 to step 124, and then the charge starting time $t_S$, the charge ending time $t_E$ and a charge interruption time interval are set so as to minimize electricity bill required to charge the vehicle storage battery 52.

Specifically, when neither the charge starting time $t_S$ nor the charge ending time $t_E$ is specified, first, the charge starting time $t_S$ is set to midnight electric power supply starting time. Next, when the charging period of time T estimated in step 120 is shorter than or equal to a midnight electric power supply period of time, the charge ending time $t_E$ is set to midnight electric power supply ending time. In addition, when the charging period of time T is shorter than the midnight electric power supply period of time, a charge interruption time interval of a length corresponding to the difference between the charging period of time T and the midnight electric power supply period of time is provided so as to complete charging of the vehicle storage battery 52 at the set charge ending time $t_E$, that is, the midnight electric power supply ending time.

As described above, the storage battery of an electric vehicle has such a characteristic that the degradation advances faster as the duration of the fully charged state elongates. When the charge ending time $t_E$ is advanced by the difference between the charging period of time T and the midnight electric power supply period of time, it is highly likely that the duration of fully charged state elongates when the target capacity $C_T$ is the upper limit capacity $C_H$ of the vehicle storage battery 52. In addition, the storage battery of an electric vehicle has such a characteristic that, when charging is completed, the temperature decreases and, therefore, the power efficiency decreases. When the charge ending time $t_E$ is advanced by the difference between the charging period of time T and the midnight electric power supply period of time, the temperature of the vehicle storage battery 52 is further decreased at the time when the vehicle 50 starts running, so it is highly likely that the power efficiency further decreases. On the other hand, there is a possibility that, because of urgent business of the user, charging of the vehicle storage battery 52 is stopped before completion of charging and then the vehicle 50 is used. In consideration of this case, the vehicle storage battery 52 may be early charged to a capacity close to the target capacity $C_T$. In consideration of these cases, in the present embodiment, as shown in FIG. 5B (and FIG. 5C) as an example, the charge interruption time interval is set at the last stage of the charging period and a predetermined period of time before completion of charging.

Figure 5B:
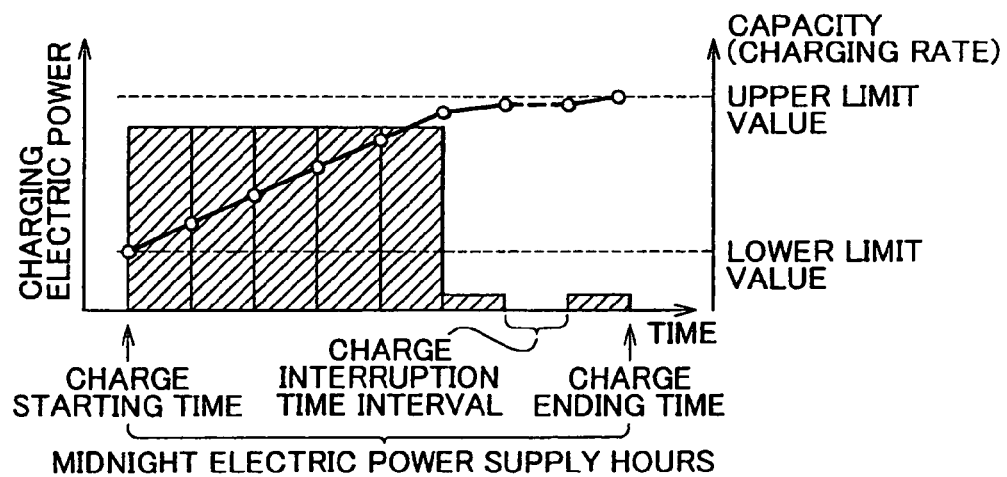
FIG. 5B and FIG. 5C are schematic graphs of examples of charging patterns applied to actual charging.

Thus, for example, to charge the vehicle storage battery 52 of which the estimated charge starting residual capacity $C_S$ is the lower limit capacity $C_L$ (actual capacity is 0) to a fully charged state, when neither the charge starting time $t_S$ nor the charge ending time $t_E$ is specified and the charging period of time T is shorter than the midnight electric power supply period of time, the charge starting time $t_S$, the charge ending time $t_E$ and the charge interruption time interval are set so as to charge the vehicle storage battery 52 in accordance with the charging pattern shown in FIG. 5B (pattern in which charging is started at the midnight electric power supply starting time, charging is completed at the midnight electric power supply ending time and charging is interrupted for a period of time corresponding to the difference between the charging period of time T and the midnight electric power supply time at the last stage of the charging period and the predetermined period of time before completion of charging (during forced charging period)). Note that, when the charging period of time T is longer than or equal to the midnight electric power supply period of time, the charge ending time $t_E$ is set at time at which the charging period of time T has elapsed from the charge starting time $t_S$ without providing the charge interruption time interval. Then, when the charge starting time $t_S$, the charge ending time $t_E$ and the charge interruption time interval are set, the process proceeds from step 124 to step 134.

In addition, when the charge starting time $t_S$ is specified by the user as the charging condition, the process proceeds from step 122 to step 126, and then the charge ending time $t_E$ and the charge interruption time interval are set in accordance with the specified charge starting time $t_S$. Setting of the charge ending time $t_E$ and the charge interruption time interval in this case specifically obtains, for example, time at which the charging period of time T has elapsed from the specified charge starting time $t_S$, and then the obtained time is directly set to the charge ending time $t_E$ when the obtained time falls outside the midnight electric power supply hours. In addition, when the obtained time falls within the midnight electric power supply hours, the midnight electric power supply ending time is set to the charge ending time $t_E$, and the charge interruption time interval of a length corresponding to the difference between the obtained time and the charge ending time $t_E$ (=midnight electric power supply ending time) at the last stage of the charging period.

In addition, when the charge ending time $t_E$ is specified by the user as the charging condition, the process proceeds from step 122 to step 128, and then the charge starting time $t_S$ and the charge interruption time interval are set in accordance with the specified charge ending time $t_E$. Setting of the charge starting time $t_S$ and the charge interruption time interval in this case specifically obtains, for example, time at which (the total of the charging period of time T and a time allowance $S_{T2}$ that takes variations of an outing period of time) is advanced from the estimated charge ending time $t_E$. When the obtained time falls outside the midnight electric power supply hours, it is determined whether the difference between the obtained time and the midnight electric power supply ending time is shorter than a predetermined period of time, and, when the determination is negative, the obtained time is directly set to the charge starting time $t_S$ without providing the charge interruption time interval. In addition, when the obtained time falls outside the midnight electric power supply hours and the difference between the obtained time and the midnight electric power supply ending time is shorter than the predetermined period of time, part of the charging period falls within the midnight electric power supply hours by providing a charge interruption time interval longer than or equal to the predetermined period of time. Therefore, the charge interruption time interval of a length longer than or equal to the predetermined period of time is provided at the last stage of the charging period, and time at which the length of the charge interruption time interval is advanced from the obtained time is set to the charge starting time $t_S$. This suppresses electricity bill required to charge the vehicle storage battery 52.

In addition, when the obtained time falls within the midnight electric power supply hours, it is determined whether the specified charge ending time $t_E$ falls within the midnight electric power supply hours. When the determination is affirmative, the obtained time is directly set to the charge starting time $t_S$ without providing the charge interruption time interval. In addition, when the obtained time falls within the midnight electric power supply hours and the specified charge ending time $t_E$ falls outside the midnight electric power supply hours, the charge interruption time interval of a length shorter than or equal to the difference between the obtained time and the midnight electric power supply starting time is provided at the last stage of the charging period, and time at which the length of the charge interruption time interval is advanced from the obtained time is set to the charge starting time $t_S$. By so doing, as shown in FIG. 5C as an example, the percentage of the charging period that falls within the midnight electric power supply hours increases, so the electricity bill required to charge the vehicle storage battery 52 is reduced.

Figure 5C:
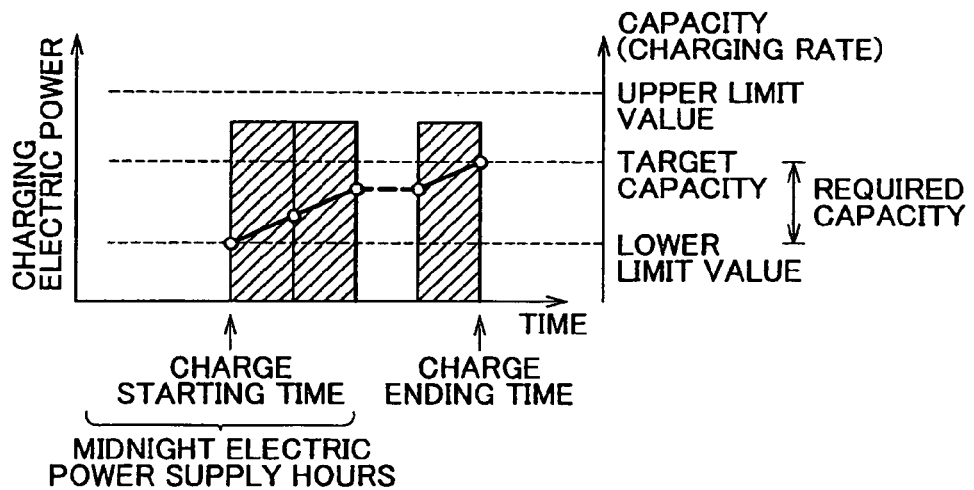

Note that FIG. 5C shows an example of the case where the estimated charge starting residual capacity $C_S$ is the lower limit capacity $C_L$ of the vehicle storage battery 52 (actual capacity is 0) and the target capacity $C_T$ is lower than the upper limit capacity $C_H$ of the vehicle storage battery 52 (when the planned travel distance is also specified); however, the estimated charge starting residual capacity $C_S$ or the target capacity $C_T$ is not limited to the above.

When the process of step 126 or step 128 is executed, the process proceeds to step 130, and then the charging condition, such as the charge starting time $t_S$ and the charge ending time $t_E$, set through the process of step 126 or step 128 is displayed on the display unit 28A of the operation panel 28, and a message for prompting the user to confirm the displayed charging conditions is also displayed on the display unit 28A. In addition, when part of (or the entire) charging period from the charge starting time $t_S$ to the charge ending time $t_E$ falls outside the midnight electric power supply hours, a message for calling user's attention to the set current charging conditions that cause high electricity bill may be displayed together like "part of (or the entire) charging period falls outside the midnight electric power supply hours. Is it O.K.?".

When some information is input by the user through the input unit 28B of the operation panel 28, the process proceeds to step 132, and then it is determined whether the charging conditions displayed on the display unit 28A are approved by the user on the basis of the input information. When the determination is affirmative, the process proceeds to step 134; whereas, when the determination is negative (when the user desires to change the charging conditions), the process proceeds to step 124 described above, and, as in the case where neither the charge starting time $t_S$ nor the charge ending time $t_E$ is specified, the charge starting time $t_S$, the charge ending time $t_E$ and the charge interruption time interval are set so as to minimize electric charge required to charge the vehicle storage battery 52.

In step 134, it is determined whether the charge starting time $t_S$ of the vehicle storage battery 52 has come, and step 134 is repeated until the determination is affirmative. When the charge starting time $t_S$ has come, the determination of step 134 is affirmative and the process proceeds to step 136, and then a command for starting supply of charging electric power to charge the vehicle storage battery 52 is issued to the power supply unit 18. By so doing, charging electric power is supplied from the power supply unit 18 to the connection and power detection unit 20, the charge control unit 54 of the vehicle 50 draws electric power having a magnitude equal to the magnitude of charging electric power at the charge starting point within the charging pattern from the connection and power detection unit 20 through the charging cable 22 and supplies the electric power to the vehicle storage battery 52 to thereby start charging the vehicle storage battery 52.

In addition, in step 136, a charging display screen 70 as shown in FIG. 4B as an example is displayed on the display unit 28A of the operation panel 28, and then the user is notified that the vehicle storage battery 52 is being charged. The charging display screen 70 has a display area 72, a display field 74A, a display field 74B and a display field 74C. The display area 72 is used to display that the current status of the vehicle storage battery 52 is any one of "charging", "complete charging", "(charging) stopped" and "abnormal stop". The display field 74A is used to display an estimated current capacity of the vehicle storage battery 52. The display field 74B is used to display an estimated remaining charging period of time. The display field 74C is used to display an estimated distance-to-empty of the vehicle 50 using the current capacity of the vehicle storage battery 52. The charging display screen 70 also has a button 76 for issuing a command to stop charging. In step 136, the display area 72 in the charging display screen 70 displayed on the display unit 28A of the operation panel 28 is switched to a display that indicates that the current status of the vehicle storage battery 52 is "charging" to thereby notify the user that the vehicle storage battery 52 is being charged.

Figure 3A:
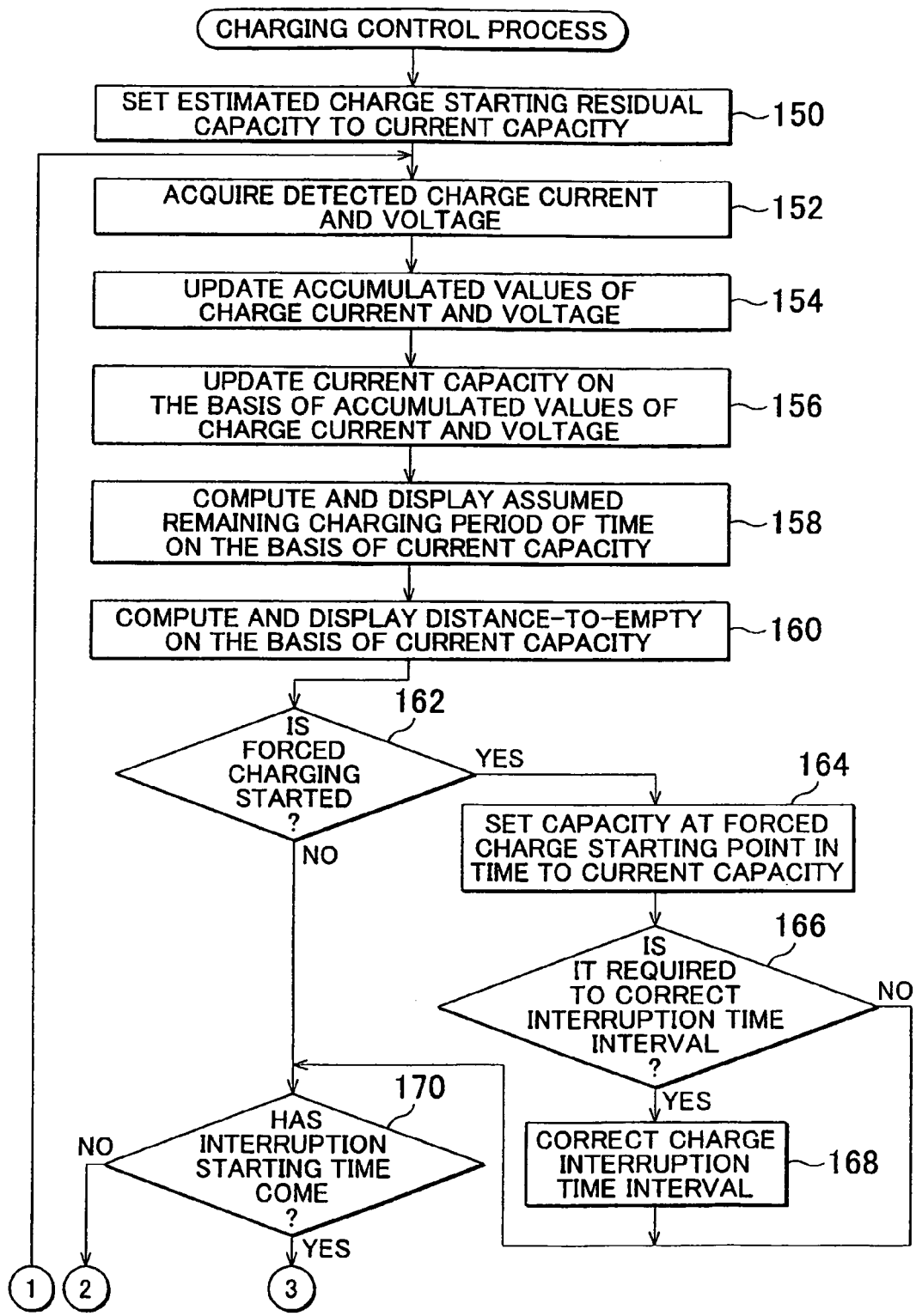
FIGS. 3A and 3B are flowcharts that show the details of charging control process according to the embodiment of the invention.
Figure 3B:
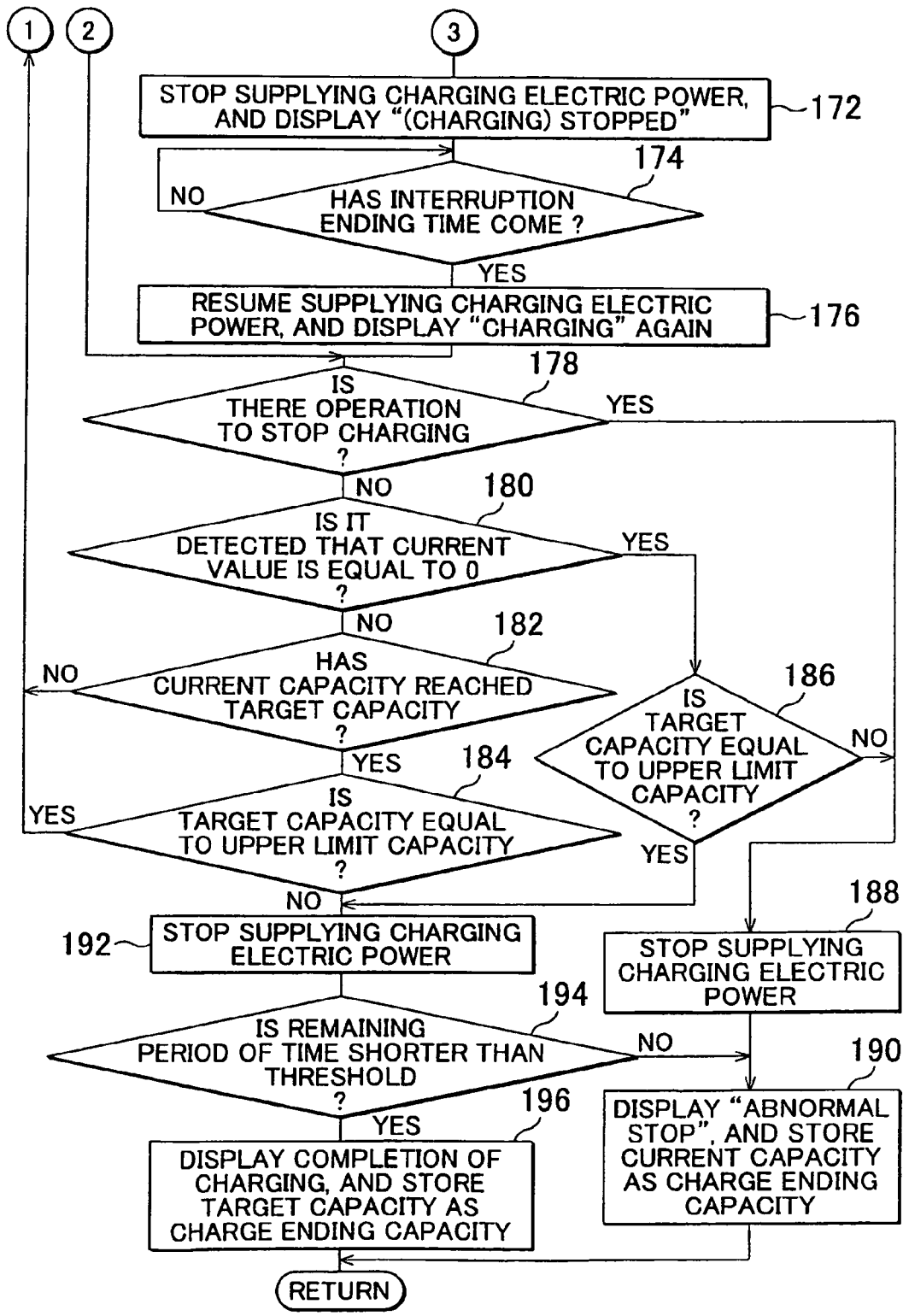

In the next step 138, the charging control process is executed. Hereinafter, the charging control process will be described with reference to FIGS. 3A and 3B. In the charging control process, first, in step 150, the estimated charge starting residual capacity $C_S$ is set as an initial current capacity C of the vehicle storage battery 52. In addition, in step 150, the process of resetting an accumulated value I of charge current and an accumulated value V of charge voltage, which will be described later, to 0 is also performed. In the next step 152, detected current (charge current) and voltage (charge voltage) of electric power, drawn from the connection and power detection unit 20 through the charging cable 22 by the charge control unit 54 of the vehicle 50, are acquired from the connection and power detection unit 20.

In step 154, the detected charge current acquired from the connection and power detection unit 20 is added to the accumulated value I of charge current, and the detected charge voltage acquired from the connection and power detection unit 20 is added to the accumulated value V of charge voltage to thereby update the accumulated value I of charge current and the accumulated value V of charge voltage. In step 156, the current capacity C of the vehicle storage battery 52 is updated using the following mathematical expression (6) on the basis of the accumulated value I of charge current and the accumulated value V of charge voltage that are updated in step 154.

$$C = C + I \cdot V \cdot \alpha \quad (6)$$

Note that, in the mathematical expression (6), $\alpha$ is the charging efficiency of the vehicle storage battery 52. In addition, the updated current capacity C of the vehicle storage battery 52 is converted into the charging rate of the vehicle storage battery 52 and is displayed in the display field 74A within the charging display screen 70.

In the next step 158, an assumed remaining charging period of time $T_X$ is estimated using the following mathematical expression (7) on the basis of the current capacity C of the vehicle storage battery 52, updated in step 156.

$$T_X = T(C_T) - T(C) + T_A \quad (7)$$

Note that, instead of the above mathematical expression (7), it is also applicable that the initially estimated charging period of time T of the vehicle storage battery 52 is reduced in accordance with a period of time elapsed from the start of charging to thereby obtain an estimated assumed remaining charging period of time $T_X$. In addition, the estimated assumed remaining charging period of time $T_X$ is displayed in the display field 74B within the charging display screen 70. Note that, instead of displaying the assumed remaining charging period of time $T_X$, it is also applicable that time at which the assumed remaining charging period of time $T_X$ has elapsed from the current time is displayed as predicted charge ending time. In step 160, the distance-to-empty $D_X$ using the current capacity C of the vehicle storage battery 52 is estimated using the following mathematical expression (8) on the basis of the current capacity C of the vehicle storage battery 52, updated in step 156.

$$D_X = (C - C_L - S_X)/(E_D - E_C \cdot N_C - (E_S/V_A)) \quad (8)$$

Note that $S_X$ in the mathematical expression (8) is an allowance that takes various errors into consideration. In addition, the estimated distance-to-empty $D_X$ is displayed in the display field 74C in the charging display screen 70.

In the next step 162, it is determined whether forced charging of the vehicle storage battery 52 is started on the basis of the detected charge current and charge voltage acquired from the connection and power detection unit 20 in step 152. This determination is made as to whether, during repeatedly acquiring the detected charge current and charge voltage from the connection and power detection unit 20, as will be described later, charging electric power obtained from the detected charge current and charge voltage acquired this time is reduced by a predetermined value or above than charging electric power obtained from the detected charge current and charge voltage acquired last time. Forced charging is carried out at the last stage of the charging period as shown in FIG. 5A, so when the detected charge current and charge voltage are initially acquired from the connection and power detection unit 20, the determination of step 162 is skipped and the process proceeds to the next step 170.

In step 170, it is determined whether the starting time of the charge interruption time interval (interruption starting time) has come. Note that, when no charge interruption time interval is provided for the current charging, the determination of step 170 is negative without condition. When the determination of step 170 is negative, the process proceeds to step 178, and then it is determined whether operation to stop charging the vehicle storage battery 52 is performed. The operation includes a first operation for selecting the button 76 within the charging display screen 70 and a second operation for releasing connection between the connector 24 at the distal end of the charging cable 22 and the power supply connecting portion 56 of the vehicle 50. When the notification that the first operation is performed is not provided from the operation panel 28 and the notification that the second operation is performed is not provided from the connection and power detection unit 20, the determination of step 178 is negative and then the process proceeds to step 180.

In step 180, it is determined whether the detected charge current acquired from the connection and power detection unit 20 in step 152 is approximately 0. When the determination is negative, the process proceeds to step 182, and then it is determined whether the current capacity C of the vehicle storage battery 52, updated in step 156, has reached the target capacity $C_T$. When the determination is negative, the process returns to step 152, and then steps 152 to 170 and 178 to 182 are repeated until the determination of any one of steps 162, 170, 178 to 182 is affirmative. Thus, during then, acquiring detected charge current and charge voltage and estimating the current capacity C of the vehicle storage battery 52, the assumed remaining charging period of time $T_X$ and the distance-to-empty $D_X$ are repeated, and the capacity C, assumed remaining charging period of time $T_X$ and distance-to-empty $D_X$ displayed in the charging display screen 70 also gradually vary with the progress of charging of the vehicle storage battery 52.

When the current charging pattern is a pattern in which forced charging is performed at the last stage of the charging period (for example in the case of the pattern shown in FIG. 5B), as the charging of the vehicle storage battery 52 approaches the last stage of the charging period, the charge control unit 54 of the vehicle 50 starts forced charging of the vehicle storage battery 52. In this case, the determination of step 162 is affirmative, and the process proceeds to step 164, and then the current capacity C of the vehicle storage battery 52 is corrected to the capacity of the vehicle storage battery 52 at the forced charge starting point in time, which may be determined from the charging pattern. In the next step 166, by comparing the deviation between the pre-corrected current capacity C and the post-corrected current capacity C with a threshold, it is determined whether it is necessary to correct the charge interruption time interval. The determination is negative without condition when no charge interruption time interval is provided for the current charging. In addition, even when the charge interruption time interval is provided for the current charging, when the deviation is smaller than the threshold, the determination of step 166 is negative, and then the process proceeds to step 170.

On the other hand, when the charge interruption time interval is provided for the current charging and the deviation is larger than or equal to the threshold, there is a possibility that the actual progress of charging is greatly deviated from an initial prediction because of temperature and other factors and then actual completion of charging greatly differs from the initially set or specified charge ending time $t_E$. Therefore, when the deviation is larger than or equal to the threshold, the determination of step 166 is affirmative and the process proceeds to step 168. Then, correction for increasing or decreasing the length of the charge interruption time interval in accordance with the sign and magnitude of the deviation is performed, after which the process proceeds to step 170. By so doing, even when the actual progress of charging is greatly deviated from the initial prediction because of temperature and other factors, an increase in deviation of actual completion of charging with respect to the initial charge ending time $t_E$ is suppressed.

In addition, when the charge interruption time interval is provided for the current charging and the interruption starting time has come, the determination of step 170 is affirmative, and the process proceeds to step 172, and then a command to stop supplying electric power is issued to the power supply unit 18. By so doing, supply of charging electric power from the power supply unit 18 to the connection and power detection unit 20 is stopped, and charging of the vehicle storage battery 52 is interrupted. In addition, in step 172, the display area 72 of the charging display screen 70 is switched to a display that indicates that the vehicle storage battery 52 is in a "(charging) stopped" state to thereby notify the user that charging of the vehicle storage battery 52 is stopped.

In the next step 174, it is determined whether the ending time of the charge interruption time interval (interruption ending time) has come, and step 174 is repeated until the determination is affirmative. When the interruption ending time has come, the determination of step 174 is affirmative and the process proceeds to step 176, and then a command to start supplying electric power is issued to the power supply unit 18. By so doing, charging electric power is supplied from the power supply unit 18 to the connection and power detection unit 20, and charging of the vehicle storage battery 52 is resumed. In addition, in step 176, the display area 72 of the charging display screen 70 is switched to a display that indicates that the vehicle storage battery 52 is in a "charging" state to thereby notify the user that charging of the vehicle storage battery 52 is resumed.

In addition, when an operation (the above described first operation or second operation) to stop charging the vehicle storage battery 52 is performed by the user before charging of the vehicle storage battery 52 is completed, the determination of step 178 is affirmative and the process proceeds to step 188, after which a command to stop supplying electric power is issued to the power supply unit 18. By so doing, supply of charging electric power from the power supply unit 18 to the connection and power detection unit 20 is stopped, and charging of the vehicle storage battery 52 is ended before completion. In the next step 190, the display area 72 of the charging display screen 70 is switched to a display that indicates that charging of the vehicle storage battery 52 is in an "abnormal stop" state to thereby notify the user that charging of the vehicle storage battery 52 is ended before completion. In addition, in step 190, the current capacity C of the vehicle storage battery 52 is stored in the storage unit 26C as the charge ending capacity $C_{EB}$, and then the process is ended.

In addition, when the detected charge current acquired from the connection and power detection unit 20 in step 152 is approximately 0, the determination of step 180 is affirmative and the process proceeds to step 186, after which it is determined whether the target capacity $C_T$ is the upper limit capacity $C_H$ of the vehicle storage battery 52. When the target capacity $C_T$ is the upper limit capacity $C_H$, the vehicle storage battery 52 is charged until a fully charged state. When the vehicle storage battery 52 becomes a fully charged state, the charge control unit 54 stops charging the vehicle storage battery 52, so charge current becomes 0. However, when the detected charge current becomes approximately 0 in a state where the target capacity $C_T$ is not the upper limit capacity $C_H$ and supply of electric power is not stopped by the power supply unit 18, it may be determined that some abnormality has occurred. Therefore, when the determination of step 186 is negative, the process proceeds to step 188, after which the process of the above described steps 188 and 190 is performed.

On the other hand, when the determination of step 186 is affirmative, it is determined that the charge control unit 54 ends charging of the vehicle storage battery 52, after which the process proceeds to step 192. Then, a command to stop supplying electric power is issued to the power supply unit 18 to thereby stop supplying charging electric power from the power supply unit 18 to the connection and power detection unit 20. In the next step 194, it is determined whether the latest assumed remaining charging period of time $T_X$ estimated in step 158 is shorter than a threshold. When the determination is affirmative, the timing at which charging of the vehicle storage battery 52 is ended does not greatly differ from the charge completion timing of the vehicle storage battery 52, indicated by the assumed remaining charging period of time $T_X$, and it may be determined that charging of the vehicle storage battery 52 has been normally completed. Therefore, the process proceeds to step 196, and the display area 72 of the charging display screen 70 is switched to a display that indicates "completion of charging" of the vehicle storage battery 52 to thereby notify the user that charging of the vehicle storage battery 52 is completed, and, in addition, the current capacity C of the vehicle storage battery 52 is stored in the storage unit 26C as the charge ending capacity $C_{EB}$, after which the process ends.

In addition, when the current capacity C of the vehicle storage battery 52, updated in step 156, has reached the target capacity $C_T$, the determination of step 182 is affirmative and the process proceeds to step 184. Then, it is determined whether the target capacity $C_T$ is the upper limit capacity $C_H$ of the vehicle storage battery 52. When the determination of step 184 is affirmative (when the target capacity $C_T$ is the upper limit capacity $C_H$), the process returns to step 152, and supply of electric power from the power supply unit 18 is continued. In this case, after charging of the vehicle storage battery 52 is completed and the detected charge current becomes approximately 0, supply of electric power from the power supply unit 18 is stopped as described above. In addition, when the determination of step 184 is negative, the process proceeds to step 192 and supply of electric power from the power supply unit 18 is stopped, after which the above described steps 194 and 196 are performed and then the process ends.

Note that, in the above embodiment, the user inputs a numeric value to specify the actual travel distance of the vehicle 50 after the last charging of the vehicle storage battery 52 or the planned travel distance of the vehicle 50 before the next charging of the vehicle storage battery 52; however, the aspect of the invention is not limited to this configuration. It is also applicable that a plurality of associated pairs of the name of a location that may be the destination to which the vehicle 50 travels and the travel distance that the vehicle 50 travels to the location as the destination are stored and then the user selects the name of a location to which the destination was set (or to which the destination will be set) to thereby recognize the actual travel distance or the planned travel distance. In addition, it is also applicable that a map is displayed on the display unit 28A, or the like, and the user selects the position on the map of a location to which the destination was set (or to which the destination will be set) to thereby recognize the actual travel distance or the planned travel distance. In addition, the actual travel distance or planned travel distance of the vehicle 50 for each time is compared, and, when the actual travel distance or the planned travel distance is substantially constant, it is determined that the user only uses the vehicle 50 to go to a fixed location and back, and charging may be performed using a constant value as the actual travel distance or the planned travel distance without requesting the user to specify the actual travel distance or the planned travel distance.

In addition, the average amount $E_C$ of electric power generated per each regenerative power generation, the number of times $N_C$ of regenerative power generation per unit travel distance of the vehicle 50 and the average speed $V_A$ of the vehicle 50 vary depending on the type of a road (general road or highway) on which the vehicle 50 traveled (or will travel), so it is applicable that the user specifies the type of a road on which the vehicle 50 traveled (or will travel) and then the average amount $E_C$ of electric power generation, the number of times $N_C$ of regenerative power generation and the average speed $V_A$ used in computing the mathematical expression (2), (4) or (8) are switched depending on the type of the specified road. Note that, as long as the user specifies the name of the destination or the position on the map as described above, the type of the road may be estimated from the specified destination.

In addition, because the average amount $E_S$ of electric power generated per unit time by the photovoltaic power generation unit also varies depending on the amount of sunlight in hours during which the vehicle 50 traveled, it is also applicable that the user specifies hours during which the vehicle 50 traveled or the weather at that time to change the average amount $E_S$ of generated electric power used in computing the mathematical expression (2), (4) or (8) depending on the specified hours or weather.

Furthermore, in the above embodiment, the vehicle 50 is an electric vehicle; instead, the aspect of the invention may be applied to charging of a storage battery of a plug-in hybrid vehicle. The plug-in hybrid vehicle may charge the storage battery with electric power generated by an engine. By so doing, the magnitude of the allowance S in each mathematical expression may be reduced as compared with that in the case of an electric vehicle.

In addition, the above embodiment is described on the assumption that the charging device 10 constantly charges the vehicle storage battery 52 of the same vehicle 50; however, the aspect of the invention is not limited. A charging target vehicle may be changed, for example, in such a manner that the user selects a charging target vehicle from among a plurality of prestored vehicles at the time of start of charging.

In addition, in the above embodiment, a method of acquiring information, such as a charging pattern, is downloading the information from a server or loading the information from a storage medium; instead, information, such as a charging pattern, may be acquired through communication with the vehicle 50. The aspect of the invention is not limited to a configuration that is not provided with means for carrying out communication between the vehicle 50 and the charging device 10.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A charging device comprising:

electric power supply device that supplies electric power to charge a storage battery equipped for a vehicle in accordance with a preset charging pattern;

capacity memory control device that stores a capacity at a charge ending point in time of the storage battery in memory device each time charging of the storage battery ends;

estimating device that estimates a residual capacity of the storage battery at a current charge starting point in time of the storage battery on the basis of a capacity of the storage battery stored in the memory device at a last charge ending point in time of the storage battery and a travel distance of the vehicle from the last charge ending point in time, input through input device, by loading from the memory device the capacity at the last charge ending point in time of the storage battery and a predetermined amount of electric power used per unit travel distance of the vehicle prestored in the memory device, computing a total amount of electric power used in the vehicle after the last charging of the storage battery on the basis of the travel distance of the vehicle after the last charging of the storage battery and the predetermined amount of electric power used per unit travel distance of the vehicle, and then estimating the residual capacity at the current charge starting point in time of the storage battery on the basis of the loaded capacity at the charge ending point in time and the computed total amount of electric power used, and that estimates at least one of a distance-to-empty of the vehicle and a required charging period of time to complete current charging of the storage battery in process of the current charging of the storage battery on the basis of the estimated residual capacity at the current charge starting point in time of the storage battery and the charging pattern or an amount of electric power supplied after the current charge starting point in time; and output device that outputs at least one of the distance-to-empty estimated by the estimating device, the required charging period of time estimated by the estimating device, and current charge ending time derived from the required charging period of time.

2. The charging device according to claim 1, wherein, when the vehicle includes power generating device and electric power generated by the power generating device is configured to be stored in the storage battery, the estimating device uses a value that is obtained by subtracting an amount of electric power generated by the power generating device after the last charging of the storage battery from a total amount of electric power used by the vehicle after the last charging of the storage battery to thereby estimate a residual capacity at the current charge starting point in time of the storage battery.

3. The charging device according to claim 2, wherein the power generating device is configured to generate regenerative electric power, and the estimating device acquires an amount of regenerative electric power per unit travel distance, generated by the power generating device, and then estimates an amount of electric power generated by the power generating device on the basis of the acquired amount of regenerative electric power per unit travel distance and a travel distance of the vehicle.

4. The charging device according to claim 2, wherein the power generating device is configured to perform photovoltaic power generation, and the estimating device acquires an amount of electric power generated per unit time by the power generating device and an average travel speed of the vehicle, and then estimates an amount of electric power generated by the power generating device on the basis of the acquired amount of electric power generated per unit time, a travel distance of the vehicle and a travel period of time of the vehicle, obtained from the acquired average travel speed of the vehicle.

5. The charging device according to claim 4, wherein the amount of electric power generated per unit time is an average amount of electric power generated by a photovoltaic power generation unit of the vehicle per unit time, which is prestored in the memory device.

6. The charging device according to claim 1, wherein the estimating device estimates a current capacity of the storage battery in process of the current charging of the storage battery and acquires an amount of electric power used per unit travel distance of the vehicle on the basis of the estimated residual capacity at the current charge starting point in time of the storage battery and the charging pattern or the amount of electric power supplied after the current charge starting point in time, and estimates the distance-to-empty of the vehicle on the basis of the estimated current capacity of the storage battery and the acquired amount of electric power used per unit travel distance.

7. The charging device according to claim 6, wherein, when the vehicle includes power generating device and electric power generated by the power generating device is configured to be stored in the storage battery, the estimating device estimates a value that is obtained by adding a distance that the vehicle can travel using the amount of electric power generated by the power generating device to a distance that the vehicle can travel and that is obtained from the estimated current capacity of the storage battery and the acquired amount of electric power used per unit travel distance as the distance-to-empty of the vehicle.

8. The charging device according to claim 6, further comprising:

detecting device that detects electric power supplied by the electric power supply device, wherein the estimating device estimates an increase in capacity of the storage battery after the current charge starting point in time of the storage battery on the basis of an amount of electric power that is supplied after the current charge starting point in time and that is obtained by accumulating electric power detected by the detecting device, and estimates a current capacity of the storage battery on the basis of the estimated increase in capacity and the residual capacity at the current charge starting point in time of the storage battery.

9. The charging device according to claim 8, wherein the charging pattern has a forced charging period, in which charging electric power to the storage battery at a last stage of a charging period of the storage battery is decreased as compared with charging electric power before the last stage within the charging period, and when the electric power detected by the detecting device changes to a value corresponding to the forced charging period, the estimating device corrects the estimated current capacity of the storage battery to a capacity of the storage battery at a starting point in time of the forced charging period, the capacity being defined in the charging pattern.

10. The charging device according to claim 9, wherein the estimating device acquires the amount of regenerative electric power per unit travel distance by multiplying an average amount of electric power generated per each regenerative power generation performed by a regenerative power generation unit of the vehicle, which is prestored in the memory device, by a number of times of regenerative power generation per unit travel distance of the vehicle, which is also prestored in the memory device.

11. The charging device according to claim 1, wherein the estimating device estimates a current capacity of the storage battery in process of the current charging of the storage battery and acquires an amount of electric power used per unit travel distance of the vehicle on the basis of the estimated residual capacity at the current charge starting point in time of the storage battery and the charging pattern or the amount of electric power supplied after the current charge starting point in time, and obtains a temporal difference in the charging pattern between the estimated current capacity of the storage battery and a target capacity of the storage battery to thereby estimate the required charging period of time to complete the current charging of the storage battery.

12. The charging device according to claim 11, wherein, when a planned travel distance of the vehicle to next charging of the storage battery is specified, the estimating device estimates a required capacity of the storage battery required by the vehicle to travel the specified planned travel distance on the basis of the specified planned travel distance of the vehicle and the amount of electric power used per unit travel distance of the vehicle, and sets the target capacity on the basis of the estimated required capacity of the storage battery.

13. The charging device according to claim 12, wherein, when the vehicle includes power generating device and electric power generated by the power generating device is configured to be stored in the storage battery, the estimating device estimates a required capacity of the storage battery, required by the vehicle to travel the specified planned travel distance, on the basis of a value obtained by subtracting an amount of electric power generated by the power generating device from an amount of electric power that is used when the vehicle travels the planned travel distance and that is obtained from the specified planned travel distance of the vehicle and the amount of electric power used per unit travel distance of the vehicle.

14. The charging device according to, claim 11, further comprising:
detecting device that detects electric power supplied by the electric power supply device, wherein
the estimating device estimates an increase in capacity of the storage battery after the current charge starting point in time of the storage battery on the basis of an amount of electric power that is supplied after the current charge starting point in time and that is obtained by accumulating electric power detected by the detecting device, and estimates a current capacity of the storage battery on the basis of the estimated increase in capacity and the residual capacity at the current charge starting point in time of the storage battery.

15. The charging device according to claim 14, wherein the charging pattern has a forced charging period, in which charging electric power to the storage battery at a last stage of a charging period of the storage battery is decreased as compared with charging electric power before the last stage within the charging period, and
when the electric power detected by the detecting device changes to a value corresponding to the forced charging period, the estimating device corrects the estimated current capacity of the storage battery to a capacity of the storage battery at a starting point in time of the forced charging period, the capacity being defined in the charging pattern.

16. The charging device according to claim 1, wherein the estimating device obtains a temporal difference in the charging pattern between the estimated residual capacity at the current charge starting point in time of the storage battery and a target capacity of the storage battery as a charging period of time from a charge starting point in time of the storage battery to a charge ending point in time of the storage battery and subtracts a period of time elapsed from the current charge starting point in time of the storage battery from the obtained charging period of time in process of the current charging of the storage battery to thereby estimate the required charging period of time to complete the current charging of the storage battery.

17. The charging device according to claim 16, wherein, when a planned travel distance of the vehicle to next charging of the storage battery is specified, the estimating device estimates a required capacity of the storage battery required by the vehicle to travel the specified planned travel distance on the basis of the specified planned travel distance of the vehicle and the amount of electric power used per unit travel distance of the vehicle, and sets the target capacity on the basis of the estimated required capacity of the storage battery.

18. The charging device according to claim 17, wherein, when the vehicle includes power generating device and electric power generated by the power generating device is configured to be stored in the storage battery, the estimating device estimates a required capacity of the storage battery, required by the vehicle to travel the specified planned travel distance, on the basis of a value obtained by subtracting an amount of electric power generated by the power generating device from an amount of electric power that is used when the vehicle travels the planned travel distance and that is obtained from the specified planned travel distance of the vehicle and the amount of electric power used per unit travel distance of the vehicle.

19. A charging method comprising:
supplying electric power to charge a storage battery equipped for a vehicle in accordance with a preset charging pattern;
storing in memory device a capacity at a first charge ending point in time of the storage battery;
estimating a residual capacity of the storage battery at a second charge starting point in time of the storage battery on the basis of the capacity of the storage battery at the first charge ending point in time of the storage battery and a travel distance of the vehicle after the first charge ending point in time, input through input device, wherein second charging is subsequent to first charging, by loading from the memory device the capacity at the first charge ending point and a predetermined amount of electric power used per unit travel distance of the vehicle prestored in the memory device, computing a total amount of electric power used in the vehicle after the last charging of the storage battery on the basis of the travel distance of the vehicle after the last charging of the storage battery and the predetermined amount of electric power used per unit travel distance of the vehicle, and then estimating the residual capacity at the current charge starting point in time of the storage battery on the basis of the loaded capacity at the charge ending point in time and the computed total amount of electric power used;

estimating at least one of a distance-to-empty of the vehicle and a required charging period of time to complete the second charging in process of the second charging of the storage battery on the basis of the estimated residual capacity at the second charge starting point in time of the storage battery and the charging pattern or an amount of electric power supplied after the second charge starting point in time; and outputting at least one of the estimated distance-to-empty, the estimated required charging period of time, and charge ending time of the second charging, derived from the required charging period of time.

* * * * *